June 22, 1965  J. KRITZ ETAL  3,190,129
ACCELEROMETER AND PARTS THEREFOR
Filed July 10, 1961  2 Sheets-Sheet 1

INVENTORS
JACK KRITZ
MICHAEL TARASEVICH
BY
*Raymond A. Paquin*
ATTORNEY.

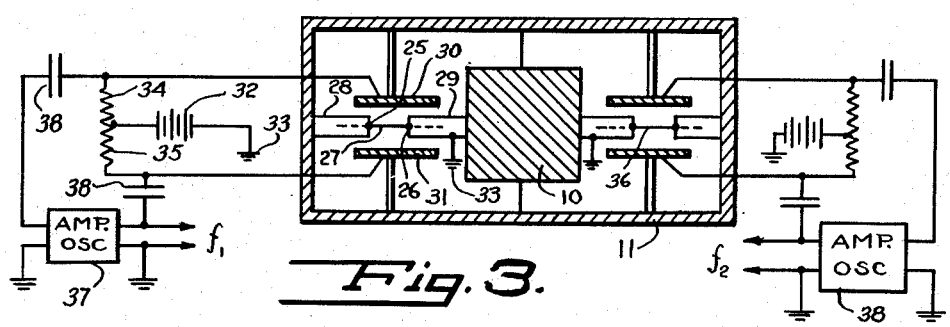
Fig. 3.
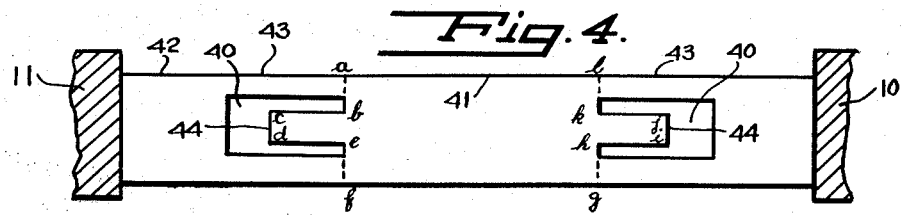
Fig. 4.
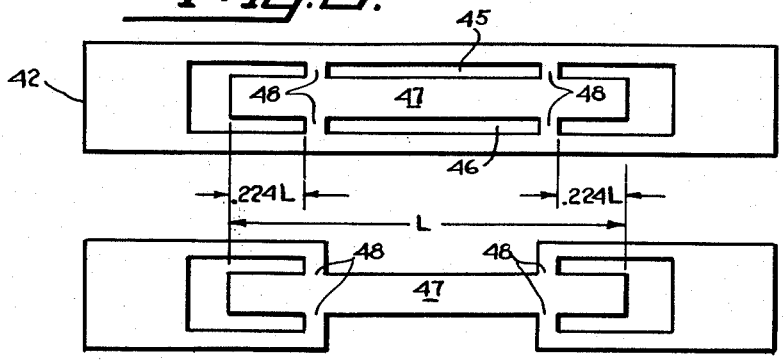
Fig. 5.
Fig. 6.
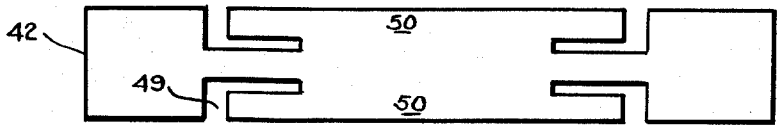
Fig. 7.
INVENTOR.
JACK KRITZ
MICHAEL TARASEVICH
BY
ATTORNEY.

//patent.freepatentsonline.com/

United States Patent Office 3,190,129
Patented June 22, 1965

3,190,129
ACCELEROMETER AND PARTS THEREFOR
Jack Kritz, Westbury, and Michael Tarasevich, Glen Cove, N.Y., assignors to American Bosch Arma Corporation, a corporation of New York
Filed July 10, 1961, Ser. No. 123,012
11 Claims. (Cl. 73—517)

The present invention relates to vibrating string accelerometers and has particular reference to the structure and mounting of the vibrating sensor elements.

The prior art vibrating string metallic sensors driven by electro-magnetic means have comprised end clamped strings or tapes. The present invention substitutes free end vibrating elements for the end clamped sensors. The free end, nodal point supported vibrator offers several advantages in construction and potential stability not present in the earlier suspension means.

The end clamped tapes permit loss of vibration energy to the structure and the mass, thereby creating an undesirable mechanical coupling between the two tapes. The end clamps, moreover, require extreme precision in assembly to insure that the edges of the clamps are in exact alignment on both sides of the tape so that the length of tape does not change during alternate cycles of vibration.

In specific embodiments of the tape construction, it has been found advantageous to make the vibrators out of a single piece of material in which the free-free beam and the nodal supports are integral. The term free-free as used herein describes the end conditions of the vibrating bar. Thus, in free-free beams both ends of the beam are unclamped and are free to vibrate. This is accomplished by relieving a film of the material at the positions to be occupied by the free ends of the beam and further relieving the margin of the film at the center to permit flexure of the longitudinal section which forms the middle of the beam. The center margin of the film may be completely removed whereby all the forces acting between the ends of the film will be active in the vibrating beam, or only some of the margin may be removed whereby the forces will be divided between the beam portion and the margin portion.

For a more complete understanding of the invention, reference may be had to the accompanying diagrams, in which:

FIGURE 3 shows a modification of FIGURE 2;

FIGURE 4 shows a particular construction of the vibrating tape;

FIGURE 5 is a modification of FIGURE 4;

FIGURE 6 is a modification of FIGURE 5; and

FIGURE 7 is another possible embodiment of the vibrating tape.

Figure 1:
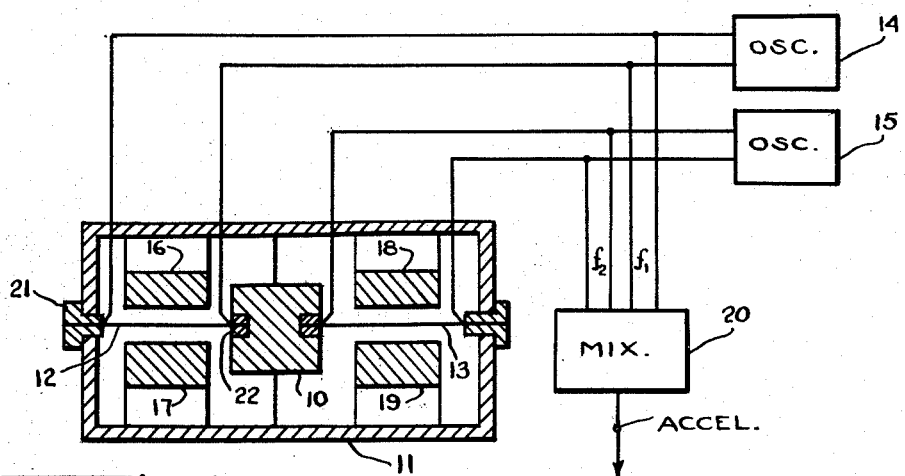
FIGURE 1 shows the overall construction of prior art device.

With reference to FIGURE 1 prior art teaches that if a proof mass 10 is suspended in a frame 11 and a pair of tension sensitive strings 12, 13 are connected between the frame 11 and the mass 10, acceleration of the frame along the axis of the strings 12, 13 causes increase in tension of one string 12, for example, and a decrease in tension of the other string 13. The difference in tension is detected by maintaining the strings in vibration at their natural frequencies by means of electronic oscillators 14, 15 which supply a current to the strings 12, 13 while the strings are located in magnetic fields provided by magnets 16, 17, 18, 19. The voltages induced across the strings by virtue of their motion in the magnetic fields supplies the feedback signal to the oscillators. If the frequency of the output of oscillator 14 is $f_1$ and the frequency of the output of oscillator 15 is $f_2$, their difference $f_1-f_2$, which may be found by a mixer 20, is a function of the acceleration being measured.

The end of string 12 is clamped to the frame 11 by the clamping device 21 and the other end is attached to the mass 10 by another clamping device 22, and the vibration of the string 12 takes place in the mode known as clamped end vibration. For precise applications the end clamping means must be adequately designed and carefully assembled so that the clamps do not alter the length of the string as it vibrates through its central position. Also, it has been found that clamping of the actively vibrating strings directly to the frame and the mass results in dissipation of the vibrational energy into the mass or frame and thereby to the other sensitive string 13, creating an undesirable mechanical coupling between the strings 12, 13.

Figure 2:
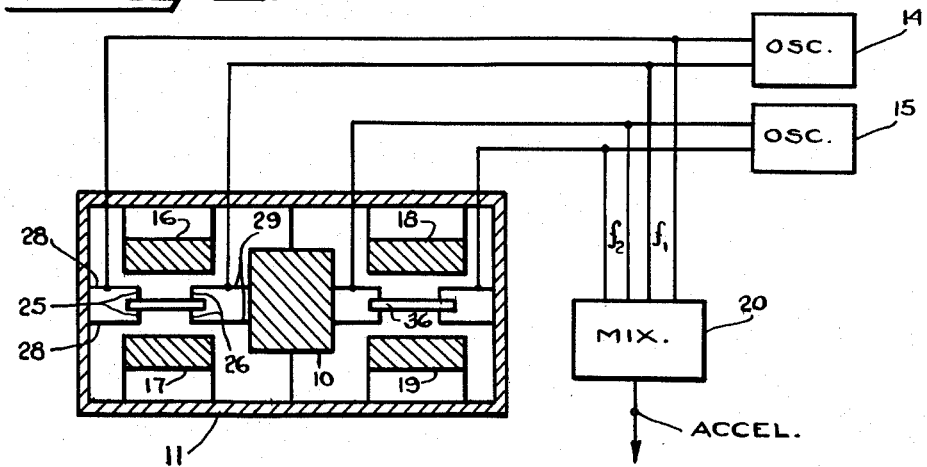
FIGURE 2 shows the construction of an accelerometer embodying the new invention.

In an effort to reduce the coupling and for reasons leading to an improvement in the ease of fabrication, the present invention proposes supporting the vibrating element at its nodal line, as in FIGURE 2. In this figure the supports 25, 26 are attached to the vibrating string or tape 27 at the position occupied by the nodal lines when the free end tape 27 is vibrating at its fundamental resonant mode. These nodal lines are displaced from the ends of the tape by about 22.4 percent of the length of the tape 27. The support 25 is attached by arms 28 to the frame 11 while the support 26 is similarly attached to mass 10 by the arms 29. In the figure, the tape 27 is located in the magnetic field of magnets 16, 17 and the output of oscillator 14 is connected at the nodal points of tape 27 by means of the supports 25, 26 and arms 28, 29 although electrical connection may be made directly to the tape 27. The tape is therefore driven into vibration perpendicular to the plane of the paper with the center of the tape coming out of the paper as the ends of the tape go into the paper, and vice versa.

FIGURE 3 is a modification of FIGURE 2 wherein the tape 27 is located in an electrostatic field between two conductive plates 30, 31. The tape 27 is kept in vibration in accordance with any of the methods explained in copending patent application S.N. 98,794 filed March 28, 1961, assigned to the assignee of this application. In one of the methods, a bias unidirectional power supply 32 is connected between the tape (which is also connected to a common terminal such as ground 33) and each of the plates 30 and 31 through like resistors 34, 35. The input of an oscillator amplifier 37 is derived between one plate, e.g., 30 and ground 33 and the output of the oscillator-amplifier is applied between the other plate 31 and ground 33. In this case the tape 27 will vibrate parallel to the plane of the paper, being alternately attracted to one or the other plate 30, 31.

For electromagnetically driving the strings or tapes, the tape must be electrically conducting but should not have magnetic properties. For electrostatically driving the strings or tapes, the tape can be either a conductor of electricity or an insulator so that the choice of materials is broadened by using electrostatic drive. The category of electrically conducting tape includes tape made of a stable material having poor electrical conductivity which is plated over with a good electrical conductor, as well as the homogeneous electrical conductor.

The accelerometers in FIGURES 2 and 3 are completed by adding the other sensor 36 opposite tape 27 in FIGURES 2 and 3. The tensions in tapes 36 and 27 will be differentially affected by a relative movement of mass 10 and the changes in tension will be detected by monitoring the frequency of the oscillators 14, 15 in FIGURE 2 and 37, 38 in FIGURE 3 in the now well known manner. FIGURES 4, 5, 6 show tapes fabricated from a single piece of thin material of which the vibrating tape or beam is to be made. FIGURE 4 shows a tape construction which is particularly adapted to the accelerometers of FIGURES 2 and 3. Here, the vibrating member is cut out of a unitary tape which effectively forms the supports tension applying member and the vibrator itself. Thus, in FIGURE 4, the ends of the tape 42 are attached to frame 11 and to weight 10. U shaped cutouts 40, define a portion of the tape ( *a, b, c, d, e, f, g, h, i, j, k, l*) which form the vibrating element. Tension is applied to this element by means of the arms 43 which are made in the tape 42 by the U cutouts while the free ends 44 emanate from the nodal lines *a, b, e, f,* and *g, h, k, l.* Depending upon the relative sizes of the relieved width *b, e* and the unrelieved width *a, b* and *e, f,* the nodal lines in the desired range will lie between 22.4 and 33 percent of the full length *c, j.* Any chosen ratios which would make the length of the free ends more than 33 percent of the length would probably be undesirable for the application here described. The material of strip 42 may be metallic or metallic plated quartz for the magnetic or electrostatic drives described in FIGURES 2 and 3 or may be piezoelectric for a piezoelectric drive. FIGURE 5 shows a modification of FIGURE 4 where a pair of longitudinal cutouts 45, 46 between the tape portion 47 and the margin of the strip clearly define nodal line supports or columns 48 by which the tape 47 is attached to a frame formed about the border of strip 42. The center of the column 48 may be at the nodal line if desired instead of having the outer edge of the column 48 at the nodal line as in FIGURE 5. FIGURE 6 shows a modification of FIGURE 5 wherein the entire margin of the strip between the tape portion 47 and the edge has ben removed. In this case all of the force applied between the ends of strip 42 is taken up by the vibrating tape 47, while in FIGURE 5 the total force is divided between the strip material between the cutouts 45, 46 and the edge of the strip 42 and the tape 47 itself.

FIGURE 7 shows another possibility where L-shaped notches 49 are cut in the strip 42 to produce vibrating tapes 50 at the edges of the strip 42 instead of at the center. The notches 49 are such that the length of the ends is between 22.4 and 33 percent of the total beam length to provide the nodal line support. The modifications of FIGS. 5 and 6 may be applied to FIG. 7 by relieving the center portion of the strip if desired. It will be seen from FIGURES 4–7 that the advantages inherent in this construction are:

The support structure is simple and is as stable as the material itself. If the entire structure is made of quartz, the instabilities formerly attributable to wire or other mechanical support mechanism are virtually eliminated.

By virtue of the monolithic construction configuration, the vibrator "Q" may be improved. The energy losses formerly occurring in separate mechanical supports are minimized.

The support structure cross sectional area can be designed so that the vibrator can experience compressive strains as well as tensile strains. For accelerometer purposes, this means that the vibrators can be operated with zero initial bias tension. If the vibrators are piezoelectric, the crystal long term frequency stability should be improved.

Quartz is an excellent insulator. The vibrator can be clamped directly to an external structure without the need for special insulating techniques provided the plating does not furnish an electrical path to the external structure. This proviso is readily realized by suitable termination of the plating.

The configuration and technique lend themselves readily to the manufacture of a unitized multiplicity of small tapes and integral supports from a large blank. For accelerometer purposes, the two tapes and supports would possess more nearly identical physical and stability characteristics than would be possible if two tapes were made from separate pieces. The stability and tracking ability of the difference frequency should be improved. In addition, simplicity of manufacture of the entire vibrating unit will be a valuable end result.

In piezoelectric devices, by suitably extending part of the crystal plating to the support structure, electrical connections can be made to the crystal without the necessity of attaching a wire directly to the active portion of the crystal. An improvement in crystal "Q" will be obtained since energy transfer to the electrical lead wires will be eliminated.

The technique is useful in manufacturing and supporting piezoelectric fibers, i.e., crystals of very small cross sections, for applications where very high sensitivity to applied forces is desirable. Manufacture of reliably mounted piezoelectric fibers by other means is difficult if not practically impossible.

The optional use of the long strips between the short nodal points columns (FIG. 5) is to prevent long term creep of the nodal columns due to bending moments which appear on the columns upon the application of tensile or compressive forces to the support structure.

The ratio of support cross sectional area to active tape cross sectional area can be adjusted to give any desired partition ratio of applied tensile or compressive forces (FIG. 5).

The anti-creep beam could be entirely cut away as in FIGURE 6 for those applications where it might be desirable that this be done.

We claim:

1. In an accelerometer for sensing acceleration along an axis, a frame, a mass suspended in said frame for freedom of motion along said axis, a bar, means for suspending said bar for free end vibration between said mass and said frame symmetrically with respect to said axis, said means including tension members attached to said bar at substantially the nodal loci and extending between said bar and said frame and between said bar and said mass and adapted to vary the longitudinal tension of said bar in accordance with the change in tension in said tension members, said bar and said tension members comprising a tape member having oppositely disposed, spaced cutouts for providing free vibrating ends extending from the nodal loci toward said frame and said mass, and means for producing about said bar a force field having a pulsating relative field strength on opposite sides of said bar, said bar being responsive to said field to vibrate in accordance with said pulsating relative field strength.

2. In an accelerometer for sensing acceleration along an axis, a frame, a mass suspended in said frame for freedom of motion along said axis, a bar, means for suspending said bar for free end vibration between said mass and said frame symmetrically with respect to said axis, said means including tension members attached to said bar at substantially the nodal loci and extending between said bar and said frame and between said bar and said mass and adapted to vary the longitudinal tension of said bar in accordance with the change in tension in said tension members, said bar and said tension members comprising a tape member having oppositely disposed, spaced cutouts for providing free vibrating ends extending from the nodal loci toward said frame and said mass and longitudinal slots on opposite sides of said tape between said cutouts, and means for producing about said bar a force field having a pulsating relative field strength on opposite sides of said bar, said bar being responsive to said field to vibrate in accordance with said pulsating relative field strength.

3. In an accelerometer for sensing acceleration along an axis, a frame, a mass suspended in said frame for freedom of motion along said axis, a bar, means for suspending said bar for free end vibration between said mass and said frame symmetrically with respect to said axis, said means including tension members attached to said bar at substantially the nodal loci and extending between said bar and said frame and between said bar and said mass and adapted to vary the longitudinal tension of said bar in accordance with the change in tension in said tension members, said bar and said tension members comprising a tape member having oppositely disposed, spaced U-shaped cutouts for providing free vibrating ends extending from the nodal loci toward said frame and said mass, and means for producing about said bar a force field having a pulsating relative field strength on opposite sides of said bar, said bar being responsive to said field to vibrate in accordance with said pulsating relative field strength.

4. In an accelerometer for sensing acceleration along an axis, a frame, a mass suspended in said frame for freedom of motion along said axis, a bar, means for suspending said bar for free end vibration between said mass and said frame symmetrically with respect to said axis, said means including tension members attached to said bar at substantially the nodal loci and extending between said bar and said frame and between said bar and said mass and adapted to vary the longitudinal tension of said bar in accordance with the change in tension in said tension members, said bar and said tension members comprising a tape member having oppositely disposed, spaced U-shaped cutouts for providing free vibrating ends extending from the nodal loci toward said frame and said mass and longitudinal slots on opposite sides of said tape between said cutouts, and means for producing about said bar a force field having a pulsating relative field strength on opposite sides of said bar, said bar being responsive to said field to vibrate in accordance with said pulsating relative field strength.

5. In a device of the character described, a resilient, integral, substantially homogeneous tape, a pair of spaced supports, means for attaching the ends of said tape to said supports, and a cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element wherein said tongues are adapted to flex in one direction and the central portion of the tape is adapted to flex in the opposite direction in response to an electrically-created pulsating force applied to said tape.

6. In a device of the character described, a resilient, integral, substantially homogeneous tape, a pair of spaced supports, means for attaching the ends of said tape to said supports, and a cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element wherein said tongues are adapted to flex in one direction and the central portion of the tape is adapted to flex in the opposite direction in response to an electrically-created pulsing force applied to said tape, the ratio of the length of one of said tongue-like portions to the length of said central portions being approximately .224 to .552.

7. In a device of the character described, a resilient, integral, substantially homogeneous tape, a pair of spaced supports, means for attaching the ends of said tape to said supports, and a U-shaped cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element wherein said tongues are adapted to flex in one direction and the central portion of the tape is adapted to flex in the opposite direction in response to an electrically-created pulsating force applied to said tape.

8. In a device of the character described, a resilient, integral, substantially homogeneous tape, a pair of spaced supports, means for attaching the ends of said tape to said supports, and a U-shaped cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element wherein said tongues are adapted to flex in one direction and the central portion of the tape is adapted to flex in the opposite direction in response to an electrically-created pulsating force applied to said tape, the ratio of the length of one of said tongue-like portions to the length of said central portion being approximately .224 to .552.

9. In a device of the character described, a resilient, integral, substantially homogeneous tape, a pair of spaced supports, means for attaching the ends of said tape to said supports, and a U-shaped cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element where in said tongues are adapted to flex in one direction and the central portion of the tape is adapted to flex in the opposite direction in response to an electrically-created pulsating force applied to said tape, and longitudinal cutouts in said central portion between the lines joining the edges of said tongue-like portions and the edges of said tape.

10. In a device of the character described, a resilient, integral, substantially homogeneous tape, a pair of spaced supports, means for attaching the ends of said tape to said supports, and U-shaped cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element wherein said tongues are adapted to flex in one direction and the central portion of the tape is adapted to flex in the opposite direction in response to an electrically-created pulsating force applied to said tape, the ratio of the length of one of said tongue-like portions to the length of said central portion being approximately .224 to .552, and longitudinal cutouts in said central portion between the lines joining the edges of said tongue-like portions and the edges of said tape.

11. In a device of the character described, a resilient, integral, substantially homogeneous tape, a pair of spaced supports, means for attaching the ends of said tape to said supports, and a U-shaped cutout near each end of said tape to remove a portion of said tape so as to leave a pair of similar tongue-like protrusions attached to the central portion of said tape, in which said tongue-like protrusions and the central portion of the tape included between said tongue-like protrusions form a vibratile element wherein said tongues are adapted to flex in one direction and the central portion of the tape is adapted to flex in the opposite direction in response to an electrically-created pulsating force applied to said tape, and longitudinal cutouts in said central portion between the lines joining the edges of said tongue-like portions and the edges of said tape, the width of said longitudinal cutout extending all the way out to the edge of the tape.

References Cited by the Examiner

UNITED STATES PATENTS

| | | | |
|---|---|---|---|
| 2,094,062 | 9/37 | Darlington | 310—15 |
| 2,713,127 | 7/55 | Harris | 310—15 |
| 2,767,338 | 10/56 | Harris | 310—26 |
| 2,822,482 | 2/58 | Harris | 310—15 |
| 2,974,530 | 3/61 | Jaouen | 73—505 |
| 2,984,111 | 5/61 | Kritz | 73—517 |

RICHARD C. QUEISSER, *Primary Examiner*.

J. E. WEST, ROBERT L. EVANS, *Examiners*.